(12) United States Patent
Chen

(10) Patent No.: US 11,485,064 B2
(45) Date of Patent: Nov. 1, 2022

(54) FILM PASTING METHOD AND FILM PASTING APPARATUS

(71) Applicant: JIANGMEN IGUARDER ELECTRONIC CO., LTD., Guangdong (CN)

(72) Inventor: Haiying Chen, Jiangmen (CN)

(73) Assignee: JIANGMEN IGUARDER ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 17/261,351

(22) PCT Filed: Dec. 28, 2018

(86) PCT No.: PCT/CN2018/124662
§ 371 (c)(1),
(2) Date: Jan. 19, 2021

(87) PCT Pub. No.: WO2020/087740
PCT Pub. Date: May 7, 2020

(65) Prior Publication Data
US 2021/0283826 A1 Sep. 16, 2021

(30) Foreign Application Priority Data
Oct. 31, 2018 (CN) .......................... 201811299975.3

(51) Int. Cl.
*B29C 63/00* (2006.01)
*B29C 63/02* (2006.01)
(Continued)

(52) U.S. Cl.
CPC ...... *B29C 63/0004* (2013.01); *B29C 63/0047* (2013.01); *B29C 63/02* (2013.01);
(Continued)

(58) Field of Classification Search
CPC ............ B29C 63/0004; B29C 63/0047; B29C 63/0053; B29C 63/0056; B29C 63/0095;
(Continued)

(56) References Cited

U.S. PATENT DOCUMENTS

2014/0116598 A1   5/2014  Lee
2014/0130971 A1*  5/2014  Wu .................... H05K 13/00
                                                   156/249

(Continued)

FOREIGN PATENT DOCUMENTS

CN    203410132 U    1/2014
CN    104589768 A    5/2015
(Continued)

OTHER PUBLICATIONS

Machine translation of JP 2003311842 date unknown.*
(Continued)

*Primary Examiner* — John L Goff, II
(74) *Attorney, Agent, or Firm* — Ware, Fressola, Maguire & Barber LLP

(57) ABSTRACT

Disclosed are a film pasting method and apparatus. The method includes: providing a protective film sheet, an electronic device and a push mechanism; aligning the protective film sheet with a screen; moving the push mechanism from a first side to a second side so as to sequentially paste the protective film sheet on the screen correspondingly. During a process of film pasting, an area where the protective film sheet is pasted with the screen defines a contact boundary proximate to the second side, the protective film sheet enters an exhaust state when the contact boundary moves, a contact angle is formed between a connection face which is formed by the contact boundary and the second side, and the screen, the contact angle gradually decreases along a moving direction of the contact boundary.

6 Claims, 3 Drawing Sheets

(51) Int. Cl.
*B32B 37/10* (2006.01)
*B32B 37/12* (2006.01)
*G06F 3/039* (2013.01)
*B29L 31/34* (2006.01)

(52) U.S. Cl.
CPC .............. *B32B 37/10* (2013.01); *B32B 37/12* (2013.01); *B29C 2063/0008* (2013.01); *B29L 2031/3437* (2013.01); *B29L 2031/3475* (2013.01); *B32B 2457/208* (2013.01); *G06F 3/0393* (2019.05)

(58) Field of Classification Search
CPC . B29C 63/02; B29C 63/04; B29C 2063/0008; B29C 2063/027; B29C 66/342; B29C 66/345; B29C 66/861; B29C 66/8362; B29C 66/93; B29C 66/934; B29C 65/7802; B29C 65/782; B29C 65/7832; B29C 65/7855; B29C 65/7858; B29C 66/93451; B32B 37/0046; B32B 37/003; B32B 37/10; B32B 37/12; B32B 2457/20; B32B 2457/202; B32B 2457/204; B32B 2457/206; B32B 2457/208; B32B 38/1833; B32B 38/1841; B32B 37/0053; B29L 2031/3475; B29L 2031/3437; G06F 3/0393
USPC ..................................... 156/87, 574
See application file for complete search history.

(56) References Cited

U.S. PATENT DOCUMENTS

2014/0338829 A1* 11/2014 Peng .................. B29C 63/0004
156/249
2020/0368974 A1* 11/2020 Choung .............. B29C 66/5326

FOREIGN PATENT DOCUMENTS

| | | | |
|---|---|---|---|
| CN | 104724312 A | | 6/2015 |
| CN | 204659133 U | | 9/2015 |
| CN | 108262941 A | | 7/2018 |
| CN | 207617265 U | | 7/2018 |
| JP | 2003311842 A | * | 11/2003 |
| JP | 2015057589 A | * | 3/2015 |
| KR | 20140071193 A | | 6/2014 |

OTHER PUBLICATIONS

Machine translation of CN 104589768 date unknown.*
Machine translation of CN 108262941 date unknown.*
International Search Report and Written Opinion from PCT/CN2018/124662 and English translation, dated Apr. 12, 2019 (15 pages).
Office Action and Search Report from Chinese Application No. 2018112999753 and English translation (11 pages).

* cited by examiner

FILM PASTING METHOD AND FILM PASTING APPARATUS

CROSS-REFERENCE TO RELATED APPLICATIONS

This application is a national stage filing under 35 U.S.C. § 371 of international application number PCT/CN2018/124662, filed Dec. 28, 2018, which claims priority to Chinese patent application No. 201811299975.3 filed Oct. 31, 2018. The contents of these applications are incorporated herein by reference in their entirety.

FIELD

The present disclosure relates to the field of film pasting technologies for electronic devices, and more particularly, to a film pasting method and a film pasting apparatus.

BACKGROUND

The use of electronic devices is becoming more and more popular in modern society, and these kinds of intelligent electronic devices are usually provided with a screen, which generally has a touch function. With fingers having a conductive characteristic, keys or menus on the screen may be touched to communicate with others or to get information. In order to prevent a screen surface from being damaged due to frequent touch, or external friction or collision, it is necessary to paste a protective film on the screen.

Current protective film is generally a hard protective film with a high strength, such as a tempered glass film, which is hard in texture and has a strong adhesion. The protective film generally includes a protective film sheet adhered with glue on one face for pasting on the screen surface, a release layer attached to an adhesive side of the protective film sheet, and a protective layer attached to the other side of the protective film sheet. In addition, in order to use cooperatively with a film pasting apparatus, a release layer and/or a protective layer is also provided with a positioning structure for positioning the protective film. A film pasting method used in a general film pasting machine includes: positioning the protective film, then peeling off the release layer, contacting the protective film sheet by a point at any position on a screen, and automatically pasting the protective film sheet on the screen. However, the film pasting method is easy to remain bubbles between the protective film sheet and the screen, resulting in a poor quality of film pasting, and reworking will reduce film pasting efficiency and even lead to damages to the protective film sheet.

SUMMARY

Aiming at the problems in the related technology, the present disclosure is intended to provide a film pasting method and a film pasting apparatus, so that a protective film is tightly pasted with a screen without bubbles, thus having a good quality of film pasting and a high efficiency of film pasting.

The technical solutions used in the present disclosure are as follows.

A film pasting method is provided including steps of providing a film pasting apparatus including a film sheet positioner, a device positioner and a push mechanism positioning a protective film which includes: providing the protective film, and positioning the protective film in the film sheet positioner, the protective film including a first side and a second side; positioning an electronic device which includes: providing the electronic device, and positioning the electronic device in the device positioner, the electronic device being provided with a screen; peeling off a release layer which includes: peeling off the release layer of the protective film from a protective film sheet; aligning the protective film sheet with the screen which includes: aligning the film sheet positioner with the device positioner, and contacting an end of the protective film sheet facing the first side with a respective end of the screen; and pasting the film by pushing and pressing which includes: moving the push mechanism from the first side to the second side so as to sequentially paste the protective film sheet on the screen correspondingly. An area where the protective film sheet is pasted with the screen defines a contact boundary proximate to the second side, a connection face is formed by the contact boundary and the second side, a contact angle is formed between the connection face and the screen, and the contact angle gradually decreases along a moving direction of the contact boundary.

As a further improvement of the above technical solution, the step of peeling off a release layer is arranged before the step of aligning the protective film sheet with the screen, or after the step of aligning the protective film sheet with the screen, or is performed synchronously with the step of pasting the film by pushing and pressing.

As a further improvement of the above technical solution, the step of pasting the film by pushing and pressing includes: sequentially pasting the protective film sheet on the screen correspondingly.

As a further improvement of the above technical solution, the step of pasting the film by pushing and pressing specifically includes: sequentially pasting the screen on the protective film sheet correspondingly.

As a further improvement of the above technical solution, the step of pasting the film by pushing and pressing includes: sequentially pasting the protective film sheet and the screen correspondingly in opposite directions respectively.

As a further improvement of the above technical solution, before the step of positioning an electronic device, the method includes a step of pre-processing the screen of the electronic device.

As a further improvement of the above technical solution, the push mechanism includes a roller shaft or a tableting device.

As a further improvement of the above technical solution, the push mechanism include a regulating component for regulating a pressing pressure.

As a further improvement of the above technical solution, the step of pasting the film by pushing and pressing includes: moving the push mechanism at a first speed and moving the contact boundary at a second speed, and the first speed being greater than the second speed.

A film pasting apparatus is provided, including: a film sheet positioner configured for positioning a protective film; a device positioner configured for positioning an electronic device; an aligning mechanism configured for aligning the film sheet positioner with the device positioner so as to align a protective film sheet of the protective film with a screen; and a push mechanism configured for pressing the protective film so as to sequentially paste the protective film sheet on the screen correspondingly.

The present disclosure has the beneficial effects as follows. Compared with the related technology, according the film pasting method provided in the present disclosure, after the first side of the protective film sheet is aligned with the screen of electronic device, the push mechanism is employed to move from the first side to the second side to sequentially paste the protective film sheet on the screen correspondingly. During a process of pasting the protective film sheet on the screen, an area where the protective film sheet is pasted with the screen defines a contact boundary proximate to the second side, the protective film sheet enters an exhaust state when the contact boundary moves, the contact angle is formed between the connection face, which is formed by the contact boundary and the second side, and the screen, and the contact angle gradually decreases along a moving direction of the contact boundary, so that a spacing distance between the protective film sheet and the screen gradually decreases, and meanwhile, a speed of pasting the protective film sheet and the screen increases. Therefore, air will not accumulate throughout the process of film pasting to cause residual bubbles in the protective film sheet after the film pasting is completed, thus having a good quality of film pasting and a high efficiency of film pasting.

The film pasting apparatus provided in the present disclosure includes the film sheet positioner, the device positioner, the aligning mechanism and the push mechanism, and the above film pasting method is used in the film pasting apparatus, thus having a high working efficiency, a high success rate of film pasting and a good quality of film pasting.

DETAILED DESCRIPTION OF THE EMBODIMENTS

Figure 1:
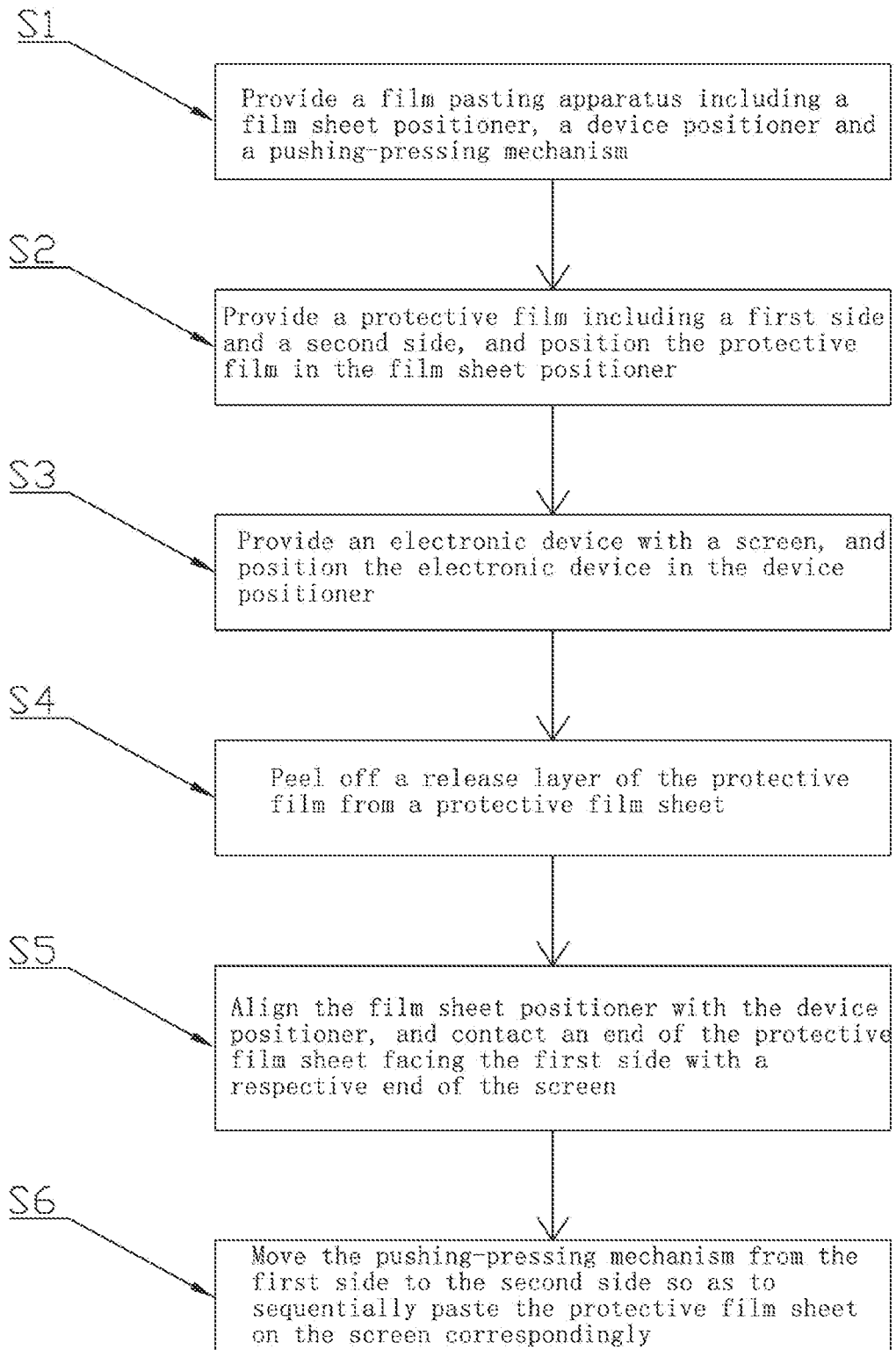
FIG. 1 is a flow chart of a film pasting method according to an embodiment of the present disclosure.

With reference to FIG. 1, a film pasting method according to an embodiment of the present disclosure includes steps S1-S6.

At S1, a film pasting apparatus is provided, including a film sheet positioner, a device positioner and a push mechanism.

At S2, a protective film is positioned which includes providing the protective film, and positioning the protective film in the film sheet positioner. The protective film includes a first side and a second side.

At S3, an electronic device is positioned which includes providing the electronic device, and positioning the electronic device in the device positioner. The electronic device is provided with a screen;

At S4, a release layer is peeled off which includes peeling off the release layer of the protective film from a protective film sheet.

At S5, the protective film sheet is aligned with the screen which includes aligning the film sheet positioner with the device positioner, and contacting an end of the protective film sheet facing the first side with a respective end of the screen.

At S6, the film is pasted by pushing and pressing which includes moving the push mechanism from the first side to the second side so as to sequentially paste the protective film sheet on the screen correspondingly.

Figure 2:
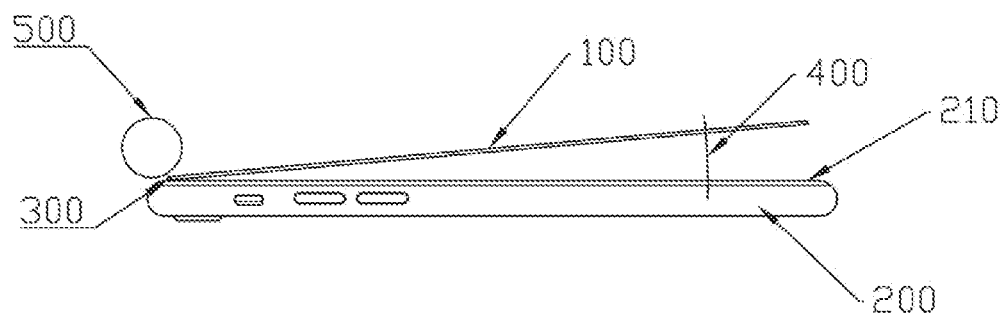
FIG. 2 is a structure diagram of aligning a protective film sheet with a screen according to an embodiment of the present disclosure.

As shown in FIG. 2 to FIG. 4 and FIG. 7, an area where the protective film sheet 100 is pasted with the screen 210 defines a contact boundary 300 proximate to the second side. The protective film sheet 100 enters an exhaust state when the contact boundary 300 moves. A contact angle 400 is formed between a connection face which is formed by the contact boundary 300 and the second side, and the screen 210, and the contact angle 400 gradually decreases along a moving direction of the contact boundary 300 so that a spacing distance between the protective film sheet 100 and the screen 210 gradually decreases, and meanwhile, a speed of pasting the protective film sheet 100 on the screen 210 increases. Therefore, air will not accumulate throughout the process of film pasting to cause residual bubbles in the protective film sheet 100 after the film pasting is completed, thus having a good quality of film pasting and a high efficiency of film pasting. Since a hard protective film is used as the protective film sheet 100 of the present disclosure, such as a tempered glass film or a film made of other new materials, which has a high hardness, a strong rigidity and a weak bending ability, the push mechanism 500 is easy to break the protective film sheet 100 during pressing in the case of an excessively large initial contact angle between the protective film sheet 100 and the screen 210, in the step S5, the contact angle 400 as shown in FIG. 2 is set in a range of 10 degrees to 30 degrees, which is preferably 10 degrees to 20 degrees, so as to avoid the protective film sheet 100 from being damaged or even damaging the screen 210 when pasting the film by pushing and pressing at step S6.

In some embodiments of the present disclosure, the step S4 may be set before the step S5 according to an embodiment as shown in FIG. 1, and the release layer is peeled off manually or through the film pasting apparatus. Alternatively, the step S4 is set after the step S5 and before the step S6. Alternatively, the step S4 is performed synchronously with the step S6 in a manner that a speed of peeling off the release layer is matched with a moving speed of the push mechanism 500, which can effectively reduce the time when the protective film sheet 100 is contacted with air, and avoid dust from being pasted between the protective film sheet 100 and the screen 210.

Figure 3:
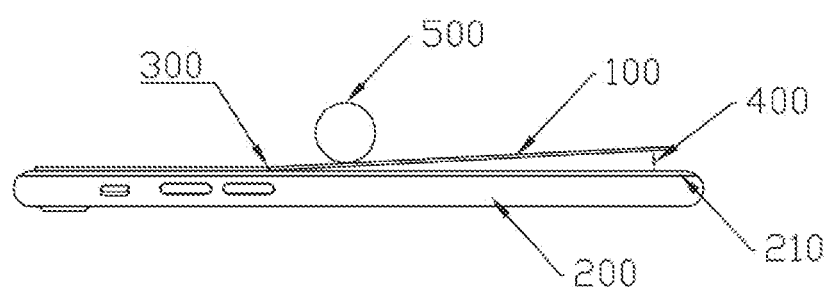
FIG. 3 is a structure diagram of partially pasting the protective film sheet on the screen according to an embodiment of the present disclosure.
Figure 4:
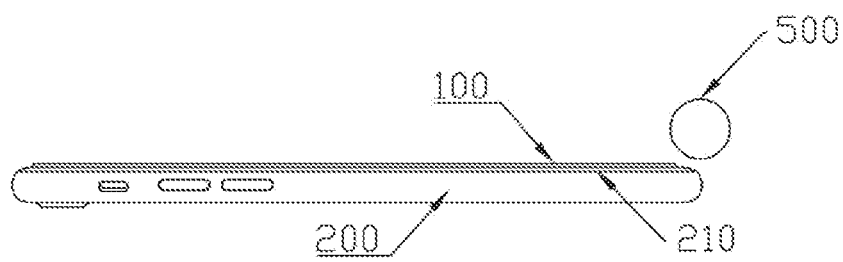
FIG. 4 is a structure diagram of completely pasting the protective film sheet on the screen according to an embodiment of the present disclosure.

In some embodiments of the present disclosure, as shown in FIG. 2 to FIG. 4, in the step S6, when the push mechanism 500 moves from the first side to the second side, the protective film sheet 100 is sequentially pasted on the screen 210 correspondingly, and the protective film sheet 100 enters an exhaust state.

Figure 5:
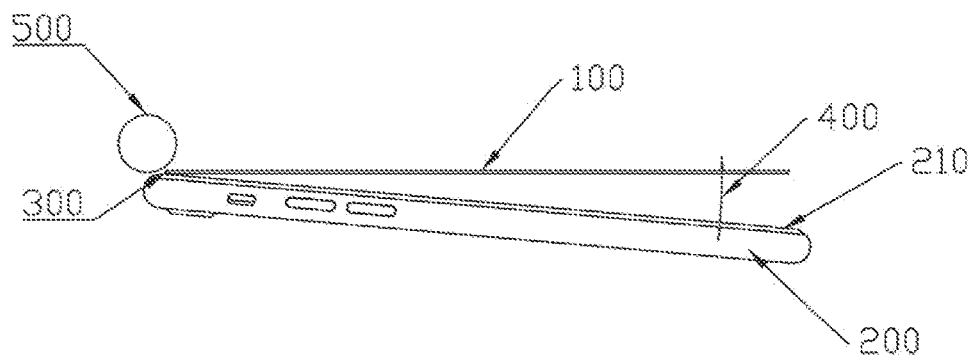
FIG. 5 is a structure diagram of aligning a protective film sheet with a screen according to an embodiment of the present disclosure.

In some embodiments of the present disclosure, as shown in FIG. 5, in the step S6, when the push mechanism 500 moves from the first side to the second side, the screen 210 gradually approaches the protective film sheet 100, the protective film sheet 100 is pressed through the push mechanism 500, so that the screen and the protective film sheet are sequentially pasted, and the protective film sheet 100 enters an exhaust state.

Figure 6:
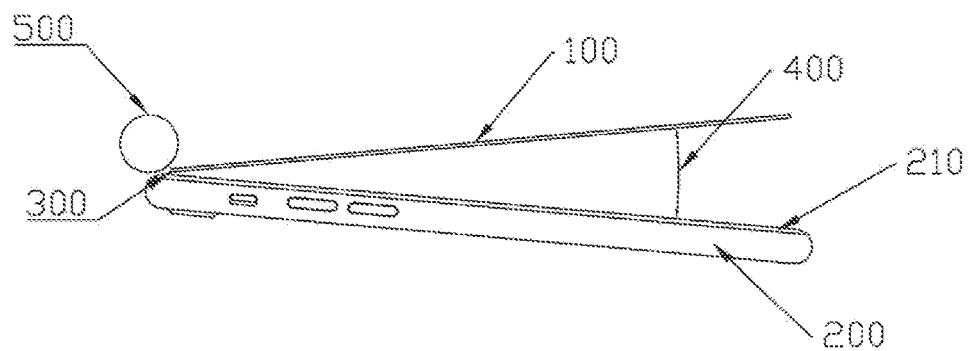
FIG. 6 is a structure diagram of aligning a protective film sheet with a screen according to an embodiment of the present disclosure.
Figure 7:
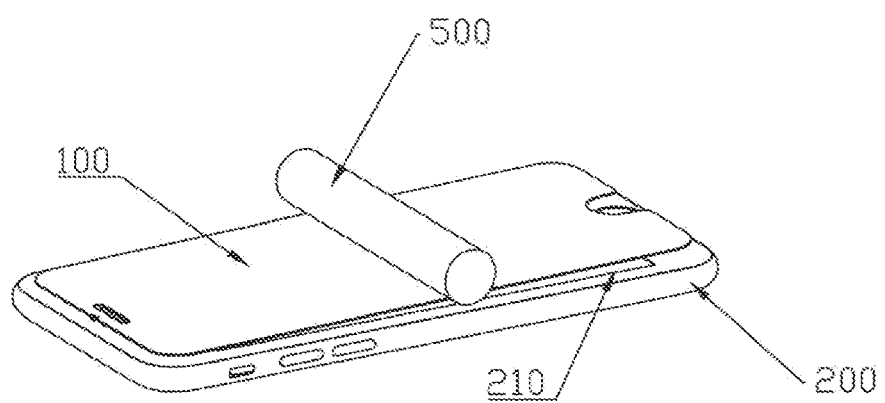
FIG. 7 is a stereoscopic structure diagram according to an embodiment of the present disclosure.

In some embodiments of the present disclosure, as shown in FIG. 6, in the step S6, when the push mechanism 500 moves from the first side to the second side, the protective film sheet 100 and the screen 210 sequentially approach in opposite directions respectively, and the protective film sheet 100 is pressed through the push mechanism 500, so that the protective film sheet and the screen are sequentially pasted, and the protective film sheet 100 enters an exhaust state.

All of the above three implementations can achieve a tight and bubble-free film pasting effect between the protective film and the screen 210, and structures of film pasting apparatus in different embodiments can implement the above three different film pasting methods.

In some embodiments of the present disclosure, the step S2 and the step S3 may be interchanged in order without affecting film pasting effect.

In some embodiments of the present disclosure, the step S3 includes pre-processing the screen 210 of the electronic device 200 to clean dirt on a surface of the screen 210, so as to improve a quality of film pasting. The pre-processing may include processing procedures such as cleaning and dust removal.

In some embodiments of the present disclosure, if after the step S6, the protective layer of the protective film is still pasted with the protective film sheet 100 after the protective film sheet 100 is completely pasted with the screen 210, it is necessary to add a step of peeling off the protective layer of the protective film from the protective film sheet 100.

In some embodiments of the present disclosure, the push mechanism 500 is mainly configured for pressing the protective film sheet 100 and moving from the first side to the second side, which is generally implemented by a roller shaft or a tabletting device.

In some embodiments of the present disclosure, the push mechanism 500 is further provided with a regulating component for regulating a pressing pressure, which may regulate the pressure according to different types of electronic devices 200 and different thicknesses of the protective film sheet 100, so as to obtain the best film pasting effect.

In some embodiments of the present disclosure, in the step S6, the push mechanism 500 has a first speed when moving, and the contact boundary 300 has a second speed when moving. If the first speed is too fast, an exhaust quality of the protective film sheet 100 is easy to be reduced, resulting in residual bubbles remaining in the protective film sheet 100 and dust easily entering a non-film-pasting area. When the first speed is too slow and lower than the second speed, the push mechanism 500 may generate a reaction force on the protective film sheet 100, which makes the pasted protective film sheet 100 bounce off the screen 210 to generate a gap, so that the bubbles enter the protective film sheet 100, and the dust is easy to enter the screen through the gap. Therefore, in the embodiment, preferably, the first speed is set to be slightly larger than the second speed, and in actual operation, the first speed is set to range from 1.5 m/s to 3 m/s, which is preferably 2 m/s, thus having a better film pasting effect.

In addition, a film pasting apparatus in this embodiment includes:

a film sheet positioner configured fir positioning a protective film;

a device positioner configured for positioning an electronic device;

an aligning mechanism configured for aligning the film sheet positioner with the device positioner so as to align a protective film sheet of the protective film with a screen; and a push mechanism configured for pressing the protective film so as to sequentially paste the protective film sheet on the screen correspondingly.

The above film pasting method is used in the film pasting apparatus in this embodiment, and the step of contacting an end of the protective film sheet facing the first side with a respective end of the screen may be implemented by positioning regulation of the aligning mechanism or pressure positioning of the push mechanism.

In the film pasting apparatus according to some embodiments of the present disclosure, the protective film sheet is sequentially pasted on the screen correspondingly, or the screen is sequentially pasted on the protective film sheet correspondingly, or the protective film sheet and the screen are sequentially pasted correspondingly in opposite directions respectively, and all the embodiments can solve the problem of film pasting of the screen.

The film pasting apparatus in this embodiment has a high working efficiency, a high success rate of film pasting and a good quality of film pasting.

The specific structures described above illustrate the preferred embodiments of the present disclosure, but is not intended to limit the implementations and the protection scope of the present disclosure. Those skilled in the art may also make various equivalent modifications or substitutions without departing from the principle of the present disclosure, and these equivalent modifications or substitutions are all included in the scope defined by the claims of the present application

The invention claimed is:

1. A film pasting method, comprising steps of:
providing a film pasting apparatus comprising a film sheet positioner, a device positioner and a push mechanism;
positioning a protective film which includes: providing the protective film, and positioning the protective film in the film sheet positioner, the protective film comprising a first side and a second side;
positioning an electronic device which includes: providing the electronic device, and positioning the electronic device in the device positioner, the electronic device being provided with a screen;
peeling off a release layer which includes: peeling off the release layer of the protective film from a protective film sheet;
aligning the protective film sheet with the screen which includes: aligning the film sheet positioner with the device positioner, and contacting an end of the protective film sheet facing the first side with a respective end of the screen; and
pasting the protective film sheet by pushing and pressing which includes: moving the push mechanism from the first side to the second side so as to sequentially paste the protective film sheet on the screen correspondingly,
wherein, an area where the protective film sheet is pasted with the screen defines a contact boundary proximate to the second side, a connection face is formed by the contact boundary and the second side, a contact angle is formed between the connection face and the screen, and the contact angle gradually decreases along a moving direction of the contact boundary,
wherein, the step of pasting the protective film sheet by pushing and pressing comprises:
moving the push mechanism at a first speed and moving the contact boundary at a second speed, and the first speed being greater than the second speed;
wherein the first speed is greater than 2 m/s and the first speed is less than or equal to 3 m/s;

wherein the step of peeling off a release layer is performed synchronously with the step of pasting the protective film sheet by pushing and pressing.

2. The film pasting method of claim 1, wherein the step of pasting the protective film sheet by pushing and pressing comprises: sequentially pasting the protective film sheet and the screen correspondingly in opposite directions respectively.

3. The film pasting method of claim 1, wherein before the step of positioning an electronic device, the method comprises a step of pre-processing the screen of the electronic device.

4. The film pasting method of claim 1, wherein the push mechanism comprises a roller shaft or a tableting device.

5. The film pasting method of claim 1, wherein the push mechanism comprises a regulating component for regulating a pressing pressure.

6. A film pasting apparatus, comprising: a film sheet positioner configured for positioning a protective film, the protective film comprising a first side and a second side; a device positioner configured for positioning an electronic device; an aligning mechanism configured for aligning the film sheet positioner with the device positioner so as to align a protective film sheet of the protective film with a screen; and a push mechanism configured for pressing from the first side to the second side of the protective film so as to sequentially paste the protective film sheet on the screen correspondingly, wherein the apparatus is configured so that an area where the protective film sheet is pasted with the screen defines a contact boundary proximate to the second side, a connection face is formed by the contact boundary and the second side, a contact angle is formed between the connection face and the screen, and the contact angle gradually decreases along a moving direction of the contact boundary, wherein the push mechanism is configured for moving at a first speed, the contact boundary configured for moving at a second speed, and the first speed being greater than the second speed and wherein the first speed is greater than 2 m/s and the first speed is less than or equal to 3 m/s.

* * * * *